United States Patent

[11] 3,534,770

| [72] | Inventor | Slawomir Kowalski<br>Rockaway, New Jersey |
|---|---|---|
| [21] | Appl. No. | 716,619 |
| [22] | Filed | March 27, 1968 |
| [45] | Patented | Oct. 20, 1970 |
| [73] | Assignee | Marotta Valve Corporation<br>Boonton, New Jersey<br>a corporation of New Jersey |

[54] FLUID CONTROL VALVE WITH FLOW RESPONSIVE LOADING
11 Claims, 3 Drawing Figs.

[52] U.S. Cl. ................................................. 137/509,
251/282, 251/130
[51] Int. Cl. ..................................................... F16k 31/06,
F16k 39/04
[50] Field of Search .......................................... 251/282;
137/495, 498, 509; 211/130

[56] References Cited
UNITED STATES PATENTS

| 316,998 | 5/1885 | Nelson et al. | 137/495X |
| 881,848 | 3/1908 | Day | 137/509 |
| 1,586,846 | 6/1926 | Ross | 137/495 |
| 2,307,949 | 1/1943 | Phillips | 251/282X |
| 2,865,397 | 12/1958 | Chenault | 251/282X |
| 2,934,090 | 4/1960 | Kennan et al. | 251/282X |
| 3,434,493 | 3/1969 | Owens | 137/498X |

*Primary Examiner*—Arnold Rosenthal
*Attorney*—Sandoe, Neill, Schottler and Wikstrom ABSTRACT: This specification discloses a flow regulator with variable output flow which is a function of an input signal or reference force, and independent of other varying parameters in the system. When operated manually, the operator can control the rate of flow by the feel of the force he exerts against the flow regulator, and when operated by an electro-magnet, the flow can be controlled by regulating the amount of current supplied to the magnet since the magnetic force varies with the current.

The flow regulator consists of a constant area orifice and a means for maintaining a constant pressure drop across this orifice for any constant reference force. A sensing piston, subject on opposite sides to the pressure upstream and downstream of the orifice, positions a metering poppet to maintain the pressure differential across the piston proportional to the input reference force.

Patented Oct. 20, 1970

3,534,770

INVENTOR
Sluwomir Kowalski
BY
ATTORNEYS.

3,534,770

FLUID CONTROL VALVE WITH FLOW RESPONSIVE LOADING

BRIEF DESCRIPTION OF THE INVENTION

Any valve element which opens against the force of a spring requires greater force to open it wider, depending upon the spring rate; but this increase in force is proportional to the displacement of the valve element and is not necessarily proportional to the rate of flow. For any given degree of opening of a valve element, the rate of flow depends upon a number of factors in addition to displacement. One of these is the downstream or back pressure, and this is an important factor because it may undergo substantial changes over relatively short periods.

It is an object of this invention to have a flow regulator with variable output flow which is a function of an input signal or reference force and independent of other variables of the system, such as inlet pressure and characteristics of receiver load down stream. The invention is useful with hydraulic equipment where the rate of flow determines the speed of movement of hydraulically operated elements and an accurate control of the rate makes possible the spotting of a cylinder or other element at an exact location, in accordance with the control by an operator of the flow of the hydraulic fluid.

The function of the flow regulator is based on the fact that flow of an incompressible fluid such as hydraulic oil through a constant area restriction (such as an orifice) is constant if the pressure drop across the restriction is unchanged.

In other words, the flow regulator consists of a constant area orifice and a means of maintaining a constant pressure drop across this orifice for any constant input force level.

The object of regulating the pressure drop across the orifice as a direct function (*i.e.* proportional) of the input signal is accomplished by a sensing piston which positions a metering valve in respect to a mating seat.

The valving element is fully balanced in respect to any external, *i.e.* both inlet and outlet, pressure fluctuations. The valving element senses the pressure differential between the upstream and downstream sides of an orifice. The metering function of the valving element, *i.e.* the throttling of fluid flow between the valve and its seat, maintains the pressure differential across a piston proportional to the input reference force. Therefore, for any particular setting of the constant orifice, and any definite input force, a constant rate of flow is obtained. By varying the input signal, a definite function of input force versus flow is generated for any particular setting of the constant orifice.

In one embodiment of the invention, the cross section of the orifice is adjustable by a motion-transmitting connection extending through the side of the valve housing to a manually operable device on the outside of the housing. This adjustment makes it possible to change the rate at which the valve-opening force increases in proportion to the rate at which the flow increases.

Other objects, features and advantages of the invention will appear or be pointed out as the description proceeds.

BRIEF DESCRIPTION OF THE DRAWING

In the drawing, forming a part hereof, in which like reference characters indicate corresponding parts in all the views.

DESCRIPTION OF PREFERRED EMBODIMENT

Figure 1:
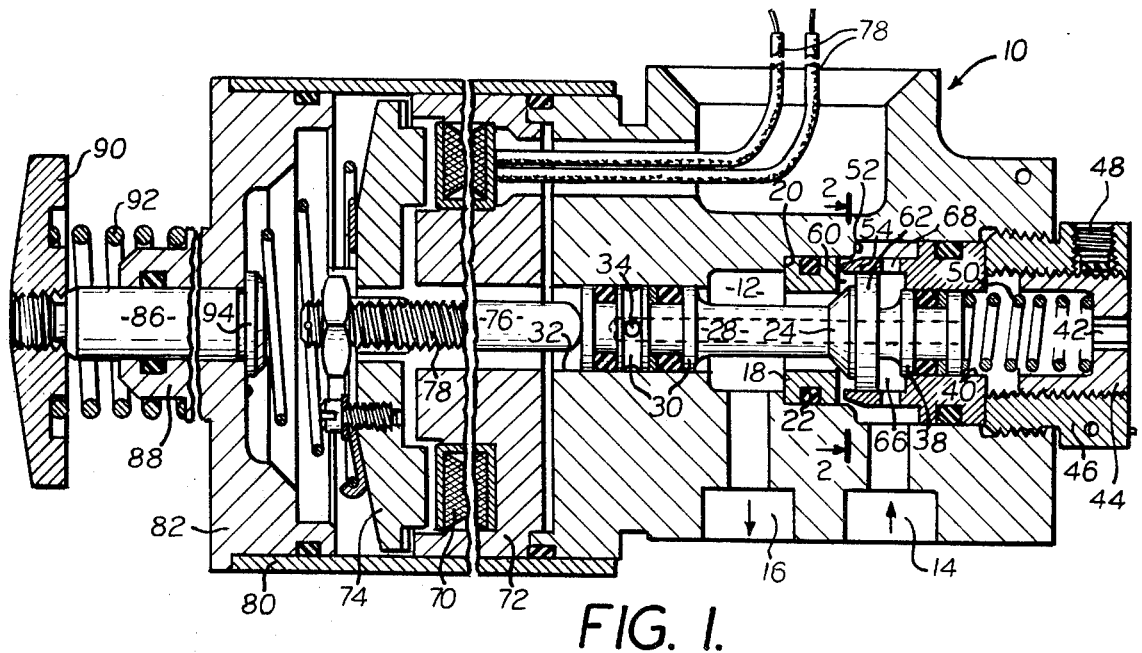
FIG. 1 is a sectional view through a flow regulator made in accordance with this invention and having electromagnetic means for supplying force to open the throttling valve.

FIG. 1 shows a valve housing 10 having a valve chamber 12 constructed with a number of counter bores to provide shoulders and opening through the righthand end of the housing 10. There is an inlet port 14 and an outlet port 16 opening through the side wall of the housing 10 at axially spaced locations along the valve chamber 12.

Between the ports 14 and 16, there is a seat element 18 located in the valve chamber 12 and pressed against a first shoulder 20 of the valve chamber. The seat element 18 has conventional sealing, such as an O-ring 22. A poppet valve element 24 contacts with the seat element 18 to shut off flow of fluid from the inlet port 14 to the outlet port 16.

The valve element 24 has a stem 28 with an enlarged end portion 30 which slides in a guideway 32 at the left hand end of the valve chamber 12; and this enlarged end portion 30 has conventional sealing, such as O-rings. The valve element 24 and its stem 28 are drilled with passages 34 to vent the space within the guideway.

At the right-hand end of the valve element 34 the stem has an enlarged end portion 38 which slides in a guideway bushing 40 with a conventional sealing ring. Beyond the enlarged end portion 38, the valve chamber 12 is vented to the ambient atmosphere through a vent 42 in a plug 44 which screws into a threaded bushing 46 and which is locked in any adjusted position along the threads of the bushing 46 by a threaded lock 48.

A spring 50 is held against the back of the valve element by the plug 44 and this spring urges the valve element 24 toward closed position. The force of the spring 50 is adjustable by screwing the plug 44 one way or the other along the threads in the threaded bushing 46.

Figure 2:
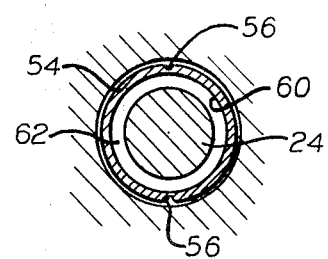
FIG. 2 is a sectional view on a reduced scale, taken on the line 2—2 of FIG. 1.

The guideway bushing 40 fits into the valve chamber 12 beyond a second shoulder 52 and it has an end portion 54 which extends into the part of the valve chamber 12 ahead of the shoulder 20. There are tapered notches 56, best shown in FIG. 2, in the end portion 54. These notches 56 serve as orifices through which fluid flows from the inlet port 14 into a special pressure chamber 60 inside the guideway bushing 40 and to the left of a flange or sensing piston 62 extending from the valve element 24 and fitting within the guideway bushing 40 as a piston.

The flange or piston 62, being an integral part of the valve element 24, slides axially in the guideway bushing 40 as the valve element 24 moves toward and from the seat element 18. There is another pressure chamber 66 in the guideway bushing 40 on the right of the flange or piston 62. Fluid under full supply pressure from the port 14 flows into this chamber 66 through ports 68 which are of substantially larger cross section than the orifices 56.

The enlarged end portions 30 and 38 of the valve element 24 have a diameter equal to the diameter of the open area through the seat element 18 for fully counterbalancing the valve element 24 in respect to both inlet and outlet pressure fluctuations. The spring 50 provides a bias for the valve element toward closed position. The imbalance of the valve element in proportion to the flow rate is obtained by the pressure differential in the special pressure chamber 60 and the pressure chamber 66 on opposite sides of the flange or piston 62.

It will be evident that when the valve element 24 is open, the pressure in the special pressure chamber 60 will be less than that in the pressure chamber 66. As the rate of flow increases, the pressure drop through the orifices 56 increases and there will be a still further drop in pressure in the special pressure chamber 60. Since there is little or no change in pressure in the pressure chamber 66, a progressively increasing pressure differential across the piston 62 builds up in opposition to the force moving the valve element 24 into open position. This force is proportional to the flow, and the proportion factor can be changed by changing the cross sections of the orifices 56.

Adjustment of the cross-sectional areas of the orifices 56 is effected by moving the guideway bushing 40 toward or from the confronting face of the valve seat element 18. In order to move the guideway bushing 40 closer to the valve seat element 18, the threaded bushing 46 is screwed further into the valve housing 10. This pushes the guideway bushing 40 toward the left in FIG. 1. Screwing the threaded bushing 46 the other way permits the pressure of the inlet port 14 to push the guideway bushing 40 toward the right to the limit imposed by the end face of the threaded bushing 46.

The valve element 24 is moved toward open position by electromagnetic means including a coil 70 surrounding a ferrous core 72, and the electromagnetic means includes also a stepped armature 74 attached to a plunger 76 which moves to the right in FIG. 1 when the armature 74 is attracted to the coil 70 and core 72. The plunger 76 is provided with a threaded connection 78 to the armature 76; and this connection is adjusted so that the plunger 76 contacts with the end face of the valve stem 28 and displaces the valve stem and valve element 24 to fully open position by the time the armature 74 completes its stroke.

A stepped armature is used so as to obtain a substantially flat force curve which makes the force exerted by the armature proportional to the current supplied to the coil 70 and substantially independent of the displacement of the armature 74 from the core 72. Thus the extent of opening of the valve element depends upon the current supplied to the coil 70; and since the force required to open the valve element is proportional to the flow, the rate of flow of fluid is proportional to the amount of current supplied to the coil 70.

Current is supplied to the coil 70 through conductors 78 which lead into the housing 10 through passages provided for the purpose. The armature 74 is enclosed in a housing formed by a cylindrical shell 80 that surrounds the core 72 and that extends beyond the armature 74. This housing for the armature 74 is closed at its left-hand end by a cover 82 fitted into the sleeve 80 and held in place by friction or suitable fastening means.

The valve shown in FIG. 1 has a manual override consisting of a plunger 86 which slides in a bearing in a boss 88 at the center of the cover 82. There is a knob 90 attached to the outer end of the plunger 86; and a spring 92 holds the plunger 86 and knob 90 normally in retracted position. A flange 94, on the inner end of the plunger 86, contacts with the inside of the cover 82 to prevent the plunger 86 from coming out of the housing. Whenever it becomes desirable or necessary to operate the valve without using the electromagnetic means, the knob 90 is pressed inward to bring the plunger 86 into contact with the end of the plunger 76 and further inward movement of the knob 90 and plunger 86 moves the armature 74 and plunger 76 to open the valve element 24 in the same way as though the coil 70 were energized. The force exerted against the knob 70 is proportional to the flow of fluid past the valve element 24 and anyone operating the valve manually by means of the knob 90 can regulate the rate of flow by the pressure which he exerts against the knob 90.

Figure 3:
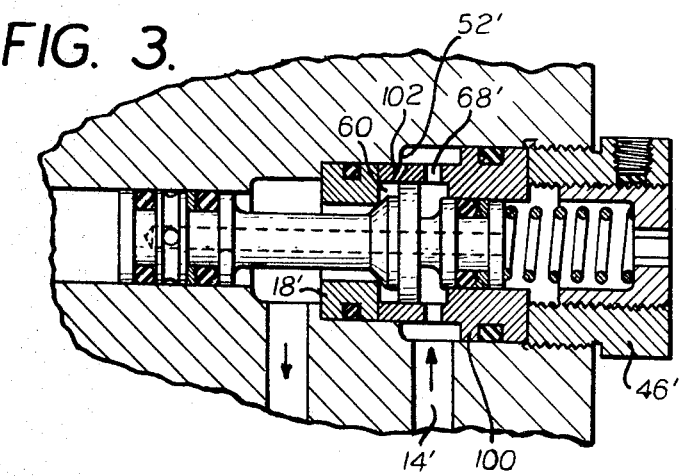
FIG. 3 is a fragmentary, detail, sectional view showing a modification of the orifice construction illustrated in FIG. 1.

FIG. 3 shows a modified form of the invention. All parts of the construction are the same except the element in which the orifice is located for controlling pressure drop to the special pressure chamber. Parts shown in FIG. 3 which correspond to the parts shown in FIG. 1 are indicated by the same reference character with a prime appended. In place of the guideway bushing 40 of FIG. 1, the construction shown in FIG. 3 has a retainer 100 which fits into the part of the valve chamber 12 which also holds the seat element 18'. This retainer holds the seat element 18' against the shoulder 20'; and the retainer 100 is clamped against the seat element 18' by the threaded bushing 46'. One or more orifices 102 are drilled through the retainer 100 just beyond the shoulder 52' for admitting fluid from the inlet port 14' into the special pressure chamber 60'. The cross section of the one or more orifices 102 is preferably smaller than the cross section of the ports 68', but the orifices are not adjustable in cross section, as in the case of FIG. 1.

The preferred embodiment of the invention has been illustrated and described, but changes and modifications can be made and some features can be used in different combinations without departing from the invention as defined in the claims.

I claim:

1. In a fluid rate-of-flow regulator valve a housing containing an upstream and a downstream passage, and a valve element movable in the housing with respect to said passages into open positions in which said passages communicate with one another and a closed position in which communication between said passages is shut off, the improvement which comprises:
   a. confronting balancing surfaces of the valve element exposed to downstream pressure, and other confronting balancing surfaces of the valve element exposed to upstream pressure;
   b. another surface of the valve element that is exposed to other pressure which is dependent on the rate of fluid flow past the valve element when said valve element is open;
   c. a pressure chamber of the housing for fluid that contacts with said other surface of the valve element;
   d. an orifice through which fluid flows as it passes through the housing when the valve element is in open position, said orifice being in position to determine the pressure of fluid in said pressure chamber and being of an area correlated with the other fluid passages through the housing so that the pressure in said pressure chamber loads the valve element to require more force to hold the valve element open as the rate of flow through the orifice increases; and
   e. a yieldable force actuator means controlled from outside the housing and that moves the valve element toward open position, the extent of opening of the valve element depending upon the force applied by the actuator means and said extent of opening becoming progressively less for any given applied force as the rate of flow increases.

2. The fluid control valve described in claim 1 characterized by the orifice being in position so that all of the fluid flowing past the valve element, when the valve element is in open position, also flows through said orifice.

3. The fluid control valve described in claim 1 characterized by the valve housing having a seat toward and from which the valve element moves in its travel between closed and open positions, a portion of the housing on the upstream side of the valve seat being a cylindrical chamber, a piston attached to the valve element and movable in the cylindrical chamber as a unit with the valve element, the upstream passage leading into the cylindrical chamber on the opposite side of the piston from the valve element, said pressure chamber being the part of the cylindrical chamber on the side of the piston that is nearer to the valve seat, and the orifice being located between the upstream passage and said pressure chamber.

4. The fluid control valve described in claim 3 characterized by the cross-section of the upstream passage where it leads into the cylindrical chamber on the opposite side of the piston from the valve element being substantially larger than the cross section of said orifice.

5. The fluid control valve described in claim 3 characterized by the pressure chamber extending from the valve seat to the nearer side of the piston.

6. The fluid control valve described in claim 5 characterized by a stem extending from the side of the piston opposite the valve element, a bore of the same diameter as the effective diameter of the valve seat and into which the stem extends, a seal around the stem, the bore beyond said seal being open to the ambient atmosphere, and a spring urging the piston and the connected valve element toward the valve seat.

7. The fluid control valve described in claim 1 characterized by means for adjusting the cross section of the orifice, and a manually-operated motion transmitting device on the outside of the housing and extending through a wall thereof operably connected with the means for adjusting the cross section of the orifice.

8. The fluid control valve described in claim 3 characterized by an end wall of the pressure chamber on which the valve seat is located, a sleeve in the chamber forming the cylindrical wall of the pressure chamber, the sleeve being movable with respect to said end wall and being at least partially spaced therefrom, the clearance of said spacing being the orifice, and means extending through a side of the housing to the outside thereof for moving the sleeve axially to change the cross section of the orifice.

9. The fluid control valve described in claim 6 characterized by the actuator means for moving the valve element toward open position including a bore in the housing on the down stream side of the valve seat, a stem operably connected with the valve element and movable axially in the bore on the downstream side of the valve element, an armature connected with the stem, and an electromagnetic winding that creates a magnetic field for moving the armature to operate the valve element.

10. The fluid control valve described in claim 1 characterized by resilient means that bias the valve element toward closed position, the actuator means including electromagnetic means for moving the valve element toward open position, a manually-operated handle on the outside of the housing, and motion transmitting connection from the handle to a part of the electromagnetic means for moving the valve element manually toward closed position in lieu of operation of the valve element by the electromagnetic means.

11. The fluid control valve described in claim 1 characterized by resilient means for moving the valve element in one direction, the actuator means including electromagnetic means for moving the valve element in the other direction including an electric winding, iron adjacent to the winding and extending lengthwise of the axis of the winding and somewhat beyond the end of the winding, an armature movable toward and from the end of the winding and said iron, the armature having a recess area into which the extending end of the iron projects when the armature is close to the end of the winding whereby the force curve of the electromagnetic means is elongated in the direction of movement of the armature.